United States Patent
Raman et al.

(10) Patent No.: US 11,757,778 B2
(45) Date of Patent: Sep. 12, 2023

(54) METHODS AND SYSTEMS FOR FAIRNESS ACROSS RDMA REQUESTERS USING A SHARED RECEIVE QUEUE

(71) Applicant: Pensando Systems Inc., Milpitas, CA (US)

(72) Inventors: Balakrishnan Raman, Fremont, CA (US); Sanjay Shanbhogue, Santa Clara, CA (US); Vishwas Danivas, Santa Clara, CA (US); Harinadh Nagulapalli, San Jose, CA (US); Murty Subba Rama Chandra Kotha, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 140 days.

(21) Appl. No.: 17/114,450

(22) Filed: Dec. 7, 2020

(65) Prior Publication Data
US 2022/0182324 A1     Jun. 9, 2022

(51) Int. Cl.
*H04L 47/12* (2022.01)
*H04L 43/16* (2022.01)
*H04L 47/11* (2022.01)

(52) U.S. Cl.
CPC .............. *H04L 47/12* (2013.01); *H04L 43/16* (2013.01); *H04L 47/11* (2013.01)

(58) Field of Classification Search
CPC ........... H04L 47/12; H04L 43/16; H04L 47/11
See application file for complete search history.

(56) References Cited

U.S. PATENT DOCUMENTS

| | | | |
|---|---|---|---|
| 2016/0072906 A1* | 3/2016 | Shuler | H04L 67/55 709/206 |
| 2017/0346742 A1* | 11/2017 | Shahar | H04L 1/1635 |
| 2018/0267919 A1* | 9/2018 | Burstein | G06F 13/4027 |
| 2019/0342199 A1* | 11/2019 | Hurson | H04L 67/1097 |
| 2020/0145349 A1* | 5/2020 | Menachem | H04L 47/2408 |

(Continued)

OTHER PUBLICATIONS

Infinibrand, "Annex A16: RDMA over Converged Ethernet (RoCE)", Supplement to InfiniBand Architecture Specification, vol. 1 Release 1.2.1, Apr. 6, 2010, 19 pgs.

(Continued)

*Primary Examiner* — Donald L Mills
(74) *Attorney, Agent, or Firm* — LOZA & LOZA LLP

(57) ABSTRACT

The InfiniBand transport protocol supports the concept of a SRQ (shared receive queue) by which multiple QPs (queue pairs) can share the same receive queue resources. According to the InfiniBand Specification, when a SRQ is enabled, flow control needs to be disabled. The lack of flow control mechanism results in there being no fairness guarantees across multiple requesters. Fairness across requesters can be obtained by implementing a SRQ configured to receive request messages from requesters initiating transactions that consume WQEs (work queue elements) of the SRQ, monitoring consumption of the WQEs by the requesters, determining that a requester has a WQE consumption exceeding a policing threshold, and in response to determining that the WQE consumption of the requester exceeds the policing threshold, sending a response message to the requester that results in reducing the WQE consumption of the requester.

20 Claims, 12 Drawing Sheets

(56) References Cited

U.S. PATENT DOCUMENTS

2020/0314181 A1* 10/2020 Eran ........................ H04L 67/10
2021/0152477 A1* 5/2021 Johnsen ................... H04L 41/12
2021/0320866 A1* 10/2021 Le ............................ H04L 49/50

OTHER PUBLICATIONS

Infinibrand, "AnnexA17: RoCEv2", Supplement to InfiniBand Architecture Specification, vol. 1 Release 1.2.1, Sep. 2, 2014, 23 pgs.
Infiniband, "InfiniBandTM Architecture Specification", vol. 1, Release 1.4, Apr. 7, 2020, 1981 pgs.
Infiniband, "InfiniBandTM Architecture Specification", vol. 2, Release 1.4, Apr. 7, 2020, 691 pgs.
Shipman, G.M. et al. "Infiniband Scalability in Open MPI", 2006, 15 pgs.
Koop, Matthew J. et al. "Scalable MPI Design over InfiniBand using eXtended Reliable Connection", 2008 IEEE International Conference on Cluster Computing, 2008, 10 pgs.
Sur, Sayatan et al. "Shared Receive Queue based Scalable MPI Design for InfiniBand Clusters", May 2006, 10 pgs.

* cited by examiner

METHODS AND SYSTEMS FOR FAIRNESS ACROSS RDMA REQUESTERS USING A SHARED RECEIVE QUEUE

TECHNICAL FIELD

The embodiments relate to storage area networks, InfiniBand, channel adapters, computer networks, network appliances, P4 packet processing pipelines, programmable packet processing pipelines implemented using special purpose circuitry, RDMA (remote direct memory access), HPC (high performance computing), and NAS (network attached storage).

BACKGROUND

High performance computing environments and data warehouses often use InfiniBand (IB) to carry data between processes, computers, and storage devices. InfiniBand is a computer networking communications standard that is published and maintained by the InfiniBand trade organization. Two consumers connected via InfiniBand each have a queue pair (QP), with each QP having a receive queue and a send queue. InfiniBand introduced SRQs (shared resource queues) in order to conserve the resources that would otherwise be dedicated to consumer's individual receive queues. The need for SRQs is explained in "The InfiniBand Architecture Specification Volume 1, Release 1.4" published by the InfiniBand Trade Association on Apr. 7, 2020 ("the InfiniBand Specification"). The InfiniBand Specification states that using QPs without an SRQ is inefficient because posting sufficient WRs (work requests) on each QP wastes WQEs (work queue entries) and associated data segments.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by an InfiniB and channel adapter. The method can include implementing a SRQ (shared receive queue) configured to receive request messages from requesters initiating transactions that consume WQEs (work queue elements) of the SRQ, monitoring consumption of the WQEs by the requesters, determining that a requester has a WQE consumption exceeding a policing threshold, and in response to determining that the WQE consumption of the requester exceeds the policing threshold, sending a response message to the requester that results in reducing the WQE consumption of the requester.

Another aspect of the subject matter described in this disclosure can be implemented by an InfiniB and channel adapter. The InfiniB and channel adapter can be configured to implement a SRQ (shared receive queue) configured to receive request messages from requesters initiating transactions that consume WQEs (work queue elements) of the SRQ, monitor consumption of the WQEs by the requesters, determine that a requester has a WQE consumption exceeding a policing threshold, and in response to determining that the WQE consumption of the requester exceeds the policing threshold, send a response message to the requester that results in reducing the WQE consumption of the requester.

Yet another aspect of the subject matter described in this disclosure can be implemented by an InfiniB and channel adapter. The InfiniB and channel adapter system can include a means for receiving request messages from multiple requesters in a single queue, and a means for enforcing fairness among the requesters in utilizing the means for receiving request messages in the single queue.

In some implementations of the methods and devices, the InfiniB and channel adapter includes a packet processing pipeline configured to process the request messages, monitor consumption of the WQEs, and send the response message. In some implementations of the methods and devices, the response message is a RNR NAK (receiver not ready negative acknowledgment). In some implementations of the methods and devices, the response message includes an acknowledge syndrome indicating a credit count that results in reducing the WQE consumption of the requester.

In some implementations of the methods and devices, monitoring WQE consumption by the requesters is performed over a predetermined time period, and reducing the WQE consumption of the requester is performed for a subsequent predetermined time period. In some implementations of the methods and devices, the method further includes initializing a counter associated with the requester at a beginning of the predetermined time period, and incrementing the counter when the requester consumes a WQE.

In some implementations of the methods and devices, the policing threshold is related to a quality of service value associated with the requester. In some implementations of the methods and devices, the policing threshold is related to a bandwidth requirement associated with the requester. In some implementations of the methods and devices, the method includes reducing the WQE consumption of the requester only when a SRQ WQE available value is below a threshold. In some implementations of the methods and devices, the policing threshold is dynamically adjusted based on a SRQ WQE available value.

In some implementations of the methods and devices, the InfiniB and channel adapter is further configured to initialize a counter associated with the requester at a beginning of a predetermined time period, increment the counter when the requester consumes a WQE, and determine the WQE consumption of the requester at an end of the predetermined time period, wherein a reduction based on the WQE consumption during the predetermined time period is applied only during an immediately subsequent predetermined time period.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
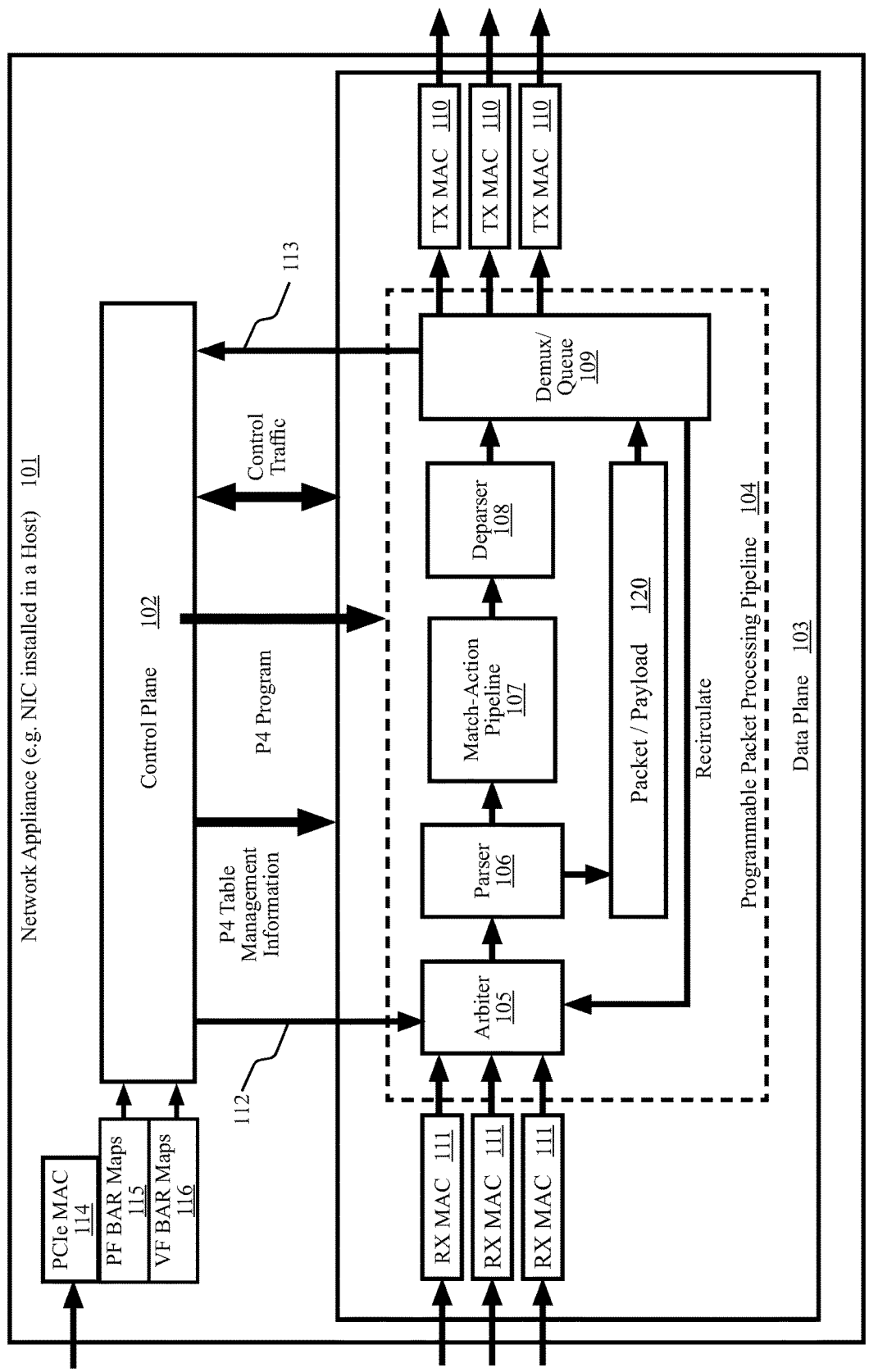
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

InfiniBand uses QPs (queue pairs) to pass data between consumers. Each QP includes a receive queue and a send queue. To pass data, the queue pairs are connected with one consumer's send queue connected to the other consumer's receive queue. An RDMA (remote direct memory access) requester is a consumer sending data, via its send queue, to the receive queue of another consumer, called the responder. The InfiniBand transport protocol describes a feature called "flow control" by which the availability of receive queue resources are communicated to the requesters connected to receive queues of responders. This information can be used by the requesters to flow control the requests. In case of depletion of resources, a responder can send "Receiver Not Ready" (RNR) NAK to a requester so that requester can wait for RNR-timeout time before retrying the request.

The InfiniBand transport protocol supports the concept of a SRQ (shared receive queue) by which multiple QPs (queue pairs) can share the same receive queue resources. According to the InfiniBand Specification, when a SRQ is enabled, flow control needs to be disabled. This is because InfiniB and flow control is designed to work for point to point communications and in the case of SRQ multiple requesters are trying to compete for the resources of a single SRQ. The lack of flow control mechanism results in there being no fairness guarantees across multiple requesters using the SRQ. One requester can consume significant, perhaps all, SRQ resources which impacts the behavior of the other requesters. Even though the SRQ is a common resource for multiple requesters, it is desirable to prevent a few requesters from overwhelming the other requesters by consuming most of the SRQ resources.

Fairness across requesters can be obtained by policing the usage of SRQ resources by requesters on an individual basis. Flow control mechanisms can throttle the offending requesters such that other requesters have access to SRQ resources. The SRQ resource consumption of each requester can be monitored and compared to a policing threshold with different requesters possibly having different thresholds based on a required bandwidth, quality of service requirements, etc. If a requester exceeds the policing threshold, then the flow control mechanisms are applied to that requester, thereby reducing the resource consumption of that requester.

The advantages of implementing fairness across the requesters connected to a SRQ include avoiding resource starvation among the requesters. Each requester consumes the resources of a computing environment and may hold those resources while blocked or halted as it awaits the completion of an IO request requiring access to the SRQ. As such, another advantage is that resources in a computing environment are released because consumers are able to proceed and free up resources. Otherwise, yet more resources are consumed as more consumers are blocked and, eventually, the entire computing environment slows. Fairness across the requesters results in fewer blocked consumers and in resources being freed as consumers complete their tasks and exit.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include InfiniB and channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. In an embodiment, the MAC protocol is Ethernet and the RX MACs are configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. In an embodiment, the TX MACs are configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload 120 may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host system's operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniB and channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers.

Figure 2:
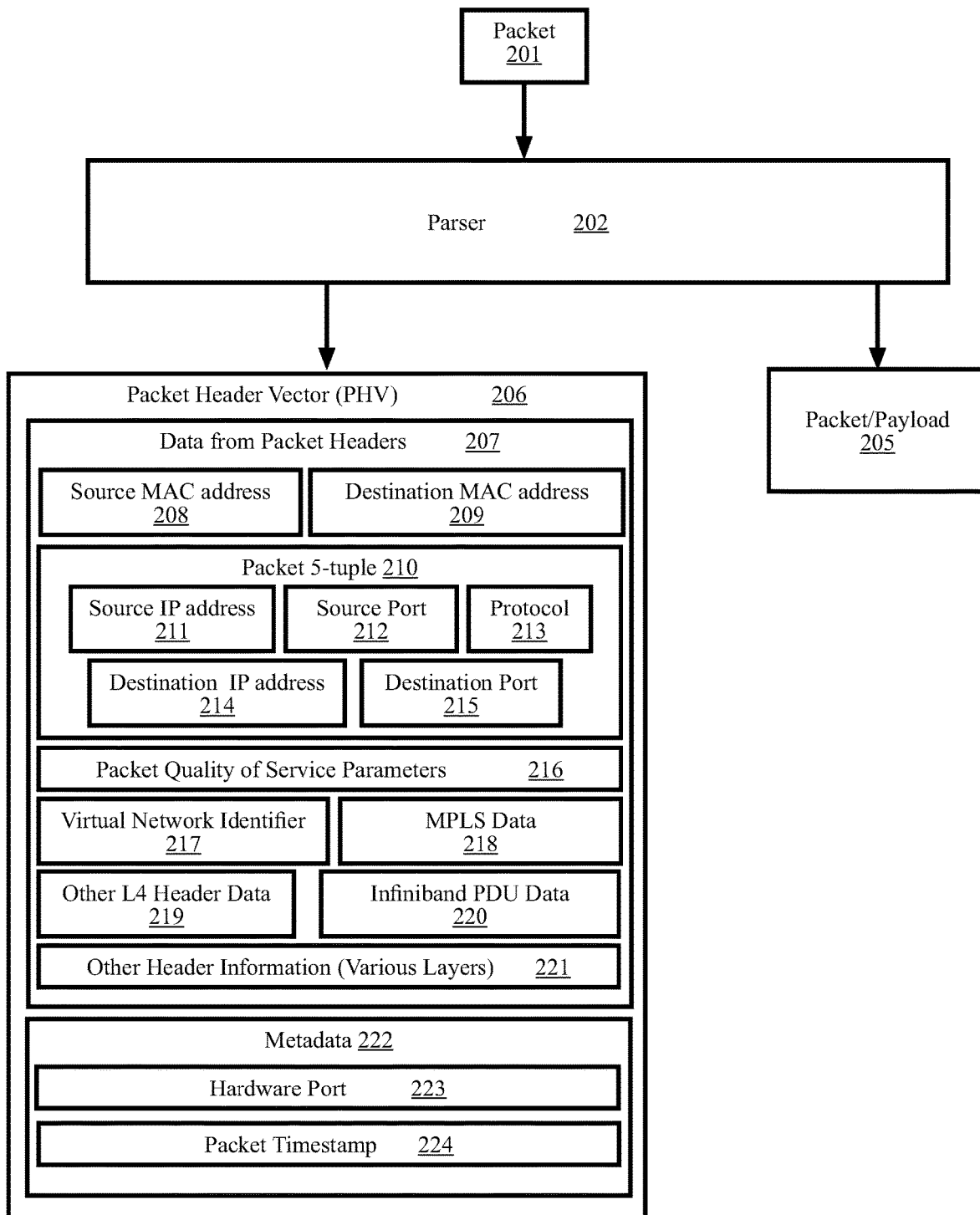
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The InfiniB and PDU (protocol data unit) data 220 can be obtained from the packet's layer 7 header and layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as InfiniB and realize that the data packets communicated among InfiniB and consumers also have well defined and standardized formats. As such, InfiniB and packets, PDUs, and packet headers can be easily created and processed by a programmable data plane such as the data plane of a P4 programmable NIC. Specifically, the parser can parse InfiniB and packets and PDUs, the match-action pipeline can process InfiniBand packets PDUs, the deparser can assemble InfiniBand packets and PDUs, the demux/queue can assemble InfiniBand packets and PDUs, and the network appliance or NIC can send and receive InfiniBand packets and PDUs.

Figure 3:
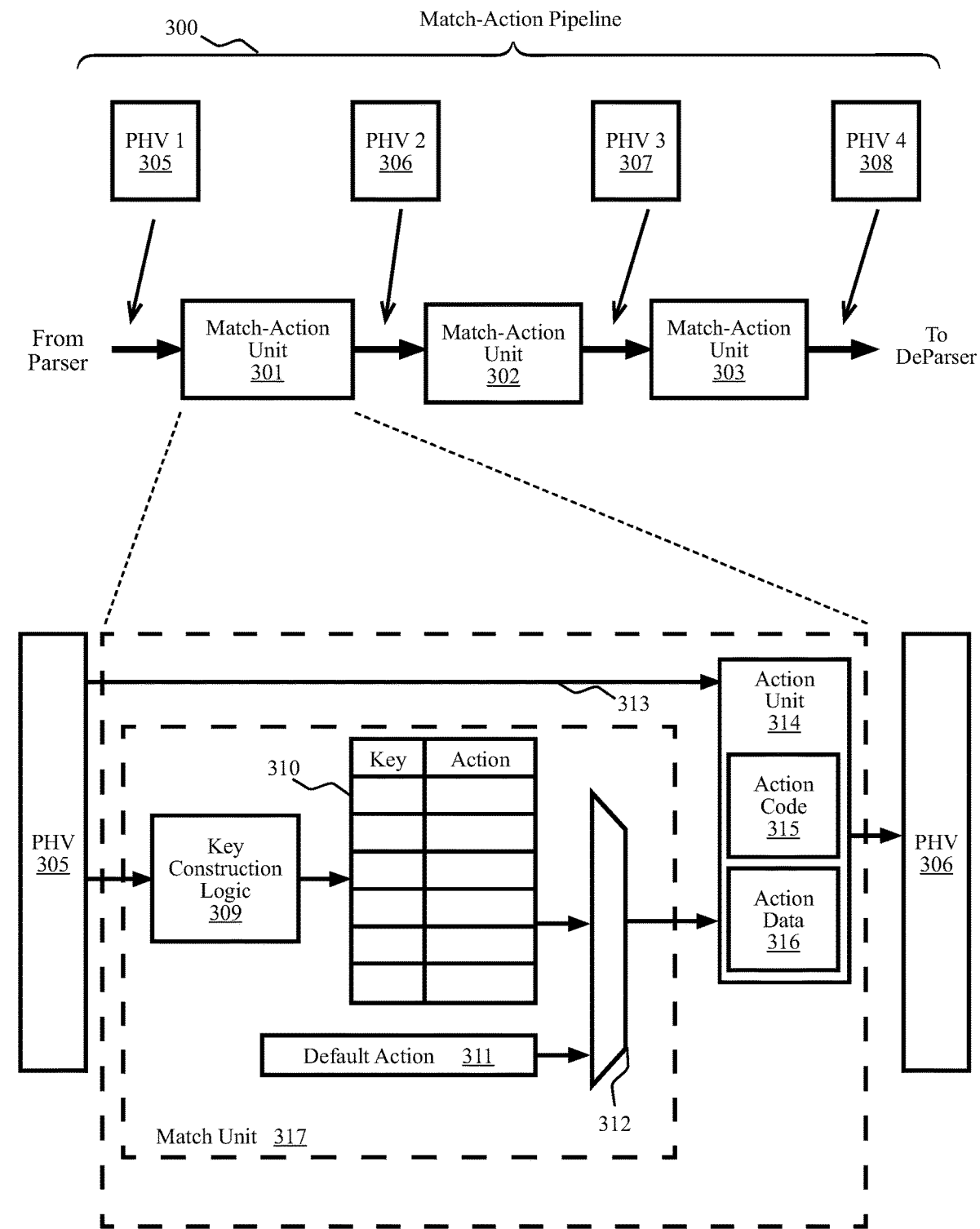
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
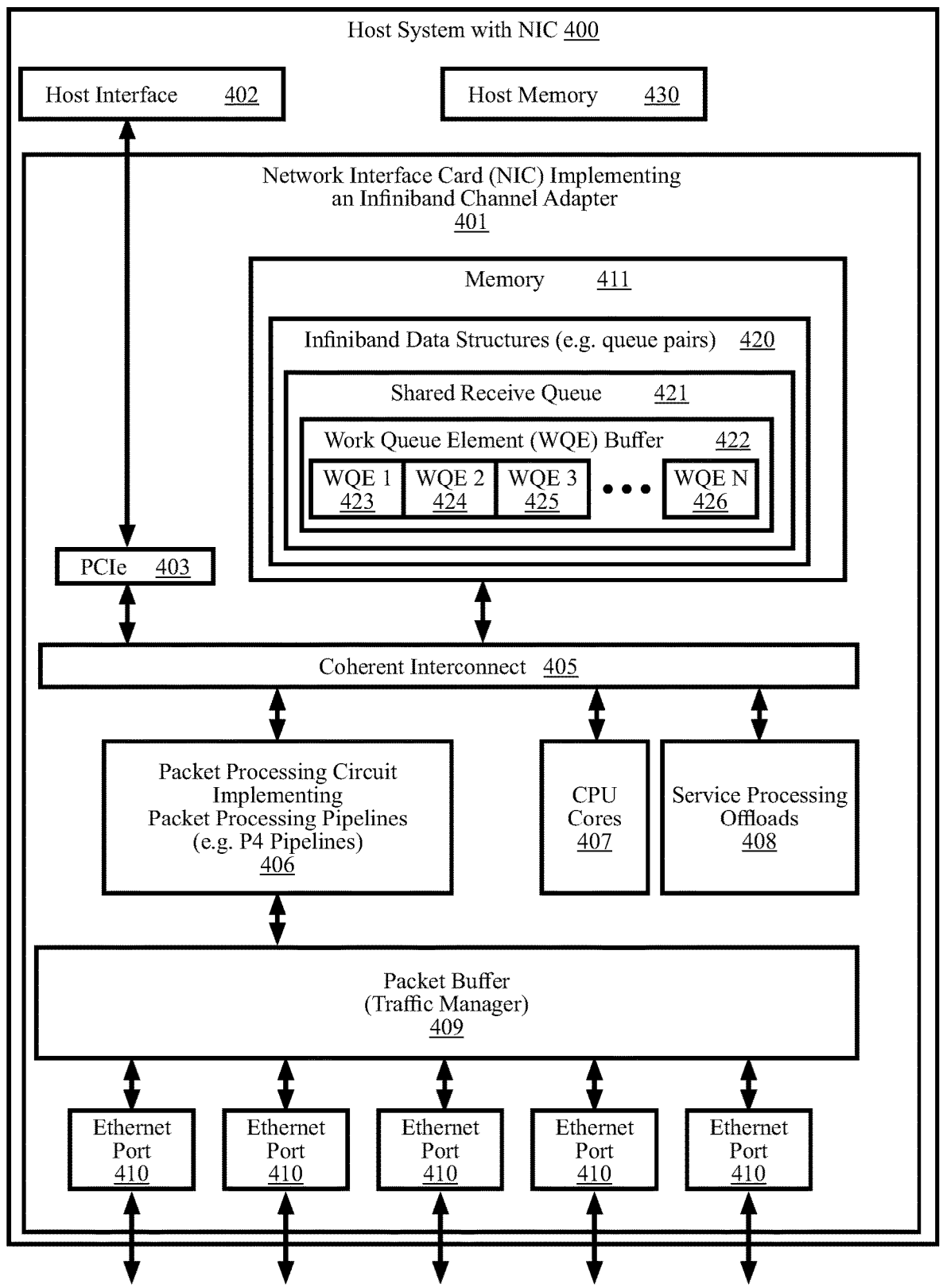
FIG. 4 is a high-level diagram of a network interface card (NIC) implementing an InfiniB and channel adapter according to some aspects.

FIG. 4 is a high-level diagram of a network interface card (NIC) implementing an InfiniB and channel adapter according to some aspects. Aspects of the embodiments, including packet processing pipelines, fast data paths, and slow data paths, can be implemented in the NIC 401. The NIC 401 can be configured for operation within a host system 400. The host system can be a general-purpose computer with a host interface 402 such as a PCIe interface. The NIC 401 can have a PCIe interface 403 through which it can communicate with the host system 400. The NIC can also include a memory 411, a coherent interconnect 405, a packet processing circuit implementing a packet processing pipeline (e.g. P4 pipelines) 406, CPU cores 407, service processing offloads 408, packet buffer 409, and ethernet ports 410.

As discussed above, the packet processing pipelines can include P4 pipelines that are configured for programming via a P4 domain-specific language for programming the data plane of network appliances and that is currently defined in the "P416 Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 401 can include a memory 411 for running Linux or some other operating system, for storing InfiniB and data structures 420, for storing large data structures such as flow tables, and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

The memory 411 can be one of the widely available memory modules or chips such as DDR4 SDRAM (double data rate 4 synchronous dynamic random-access memory). As such, the InfiniBand data structures (e.g. queue pairs, work queue elements a.k.a. WQEs, etc.) can be written to a memory chip or circuit such as a DDR memory on the NIC 401. The InfiniBand data structures can also be written to a host memory 430 of the host system.

In an embodiment, the CPU cores 407 are general purpose processor cores, such as ARM processor cores, MIPS (Microprocessor without Interlocked Pipeline Stages) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU cores 407 also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 408 are specialized hardware modules purposely optimized to handle specific tasks at wire speed, such as cryptographic functions, compression/decompression, etc.

The packet buffer 409 can act as a central on-chip packet switch that delivers packets from the network interfaces 410 to packet processing elements of the data plane and vice-versa. The packet processing elements can include a slow data path implemented in software and a fast data path implemented by packet processing circuitry 406.

The packet processing circuit implementing packet processing pipelines 406 can be a specialized circuit or part of a specialized circuit using one or more ASICs or FPGAs to implement a programmable packet processing pipeline such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 407 and memory 411 are configured via software to implement a slow data path. A network appliance having two data paths has a fast data path and a slow data path when one of the data paths process packets faster than the other data path.

All memory transactions in the NIC 401, including host memory, on board memory, and registers may be connected via a coherent interconnect 405. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing packet processing pipelines 406, CPU cores 407, and PCIe interface 403. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory can contain executable code and data such as InfiniB and data structures 420. The InfiniBand data structures 420 can include QPs (queue pairs) and a SRQ (shared resource queue) 421. The SRQ 421 can have numerous WQEs (work queue elements) in a WQE buffer 422. The WQE buffer can be a section of the memory 411 storing WQE 1 423, WQE 2 424, WQE 3 425, and WQE N 426.

The memory can store executable code that can be executed by the CPU cores to implement an InfiniB and channel adapter and to configure a packet processing pipeline to implement aspects of an InfiniB and channel adapter. For example, the packet processing pipeline can be configured to implement the receive side of an InfiniB and RDMA function that includes unpacking InfiniB and PDUs from ethernet packets and storing data from the InfiniB and PDUs directly into buffers specified by the WQEs of the SRQ.

Figure 5:
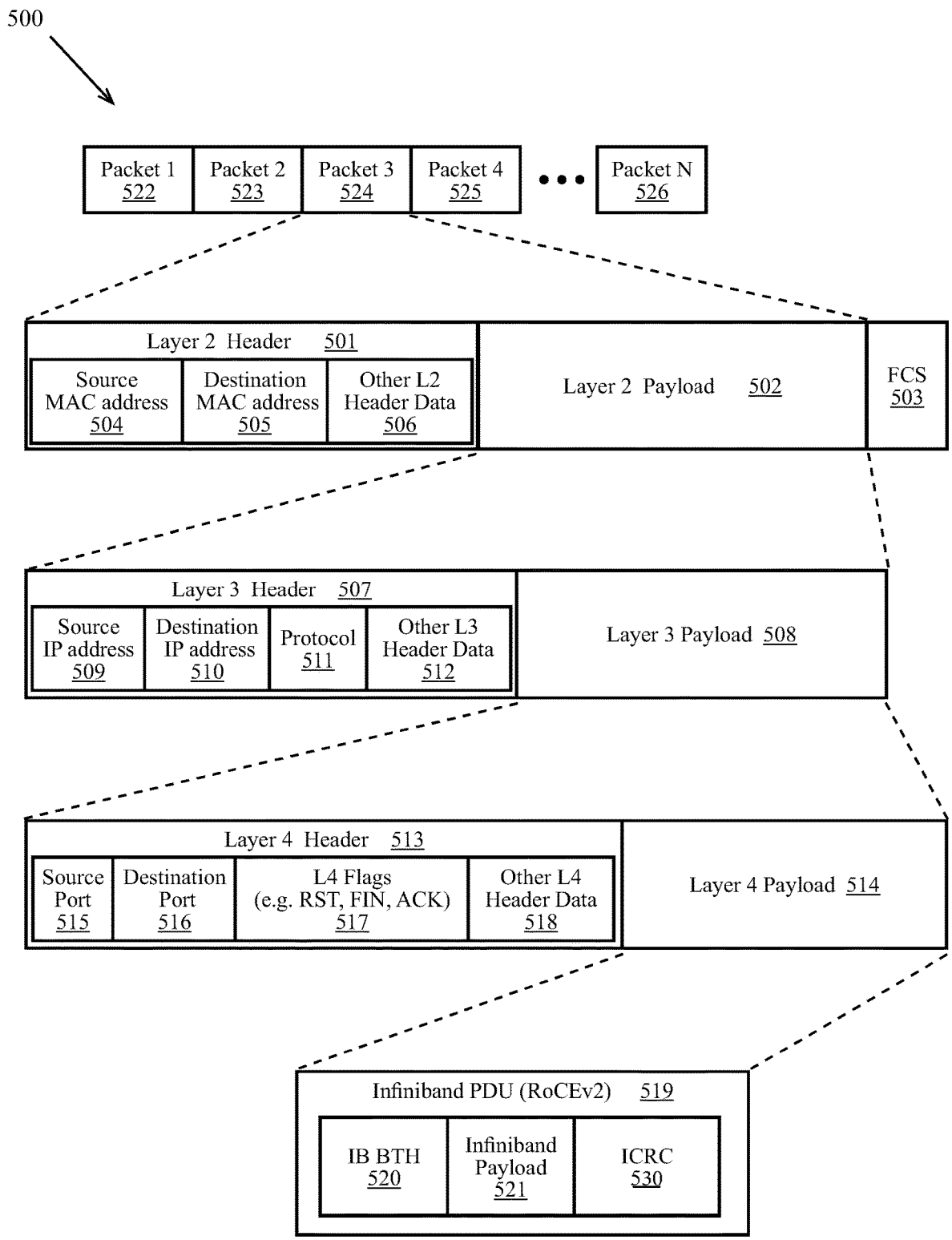
FIG. 5 illustrates packet headers and payloads of packets for network traffic flows including InfiniBand PDUs according to some aspects.

FIG. 5 illustrates packet headers and payloads of packets for network traffic flows 500 including InfiniBand PDUs according to some aspects. A network traffic flow 500 can have numerous packets such as a first packet 522, a second packet 523, a third packet 524, a fourth packet 525, and a final packet 526 with many more packets between the fourth packet 525 and the final packet 526. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 FCS (frame check sequence). The layer 2 header can contain a source MAC address 504, a destination MAC address 505, and other layer 2 header data 506. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 7 packet may be an InfiniBand PDU 519 having an InfiniBand BTH (base transport header) 520, InfiniBand payload 521, and ICRC (invariant cyclic redundancy check) 530. The BTH specifies the destination QP and indicates the operation code, packet sequence number, and partition key. The ICRC is a CRC covering the fields in the PDU that do not change from the source to the destination.

Figure 6:
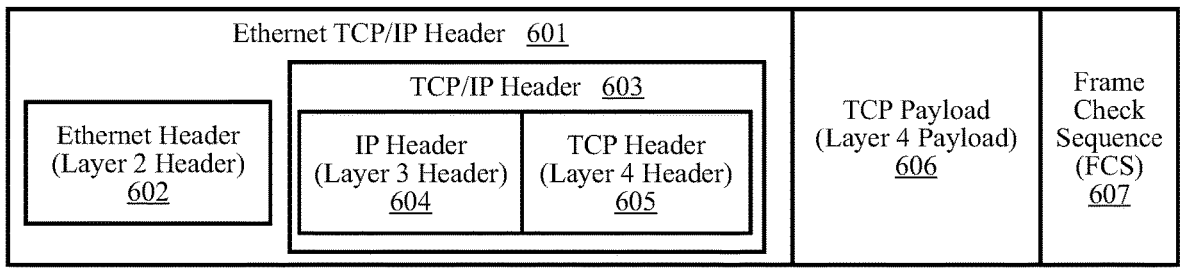
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and a frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
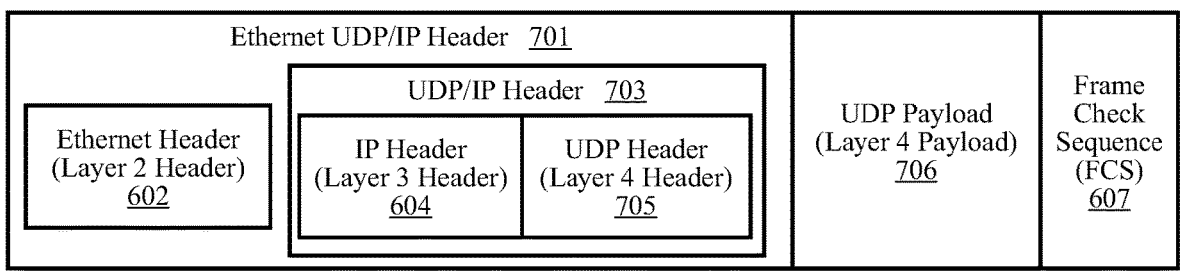
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and a frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
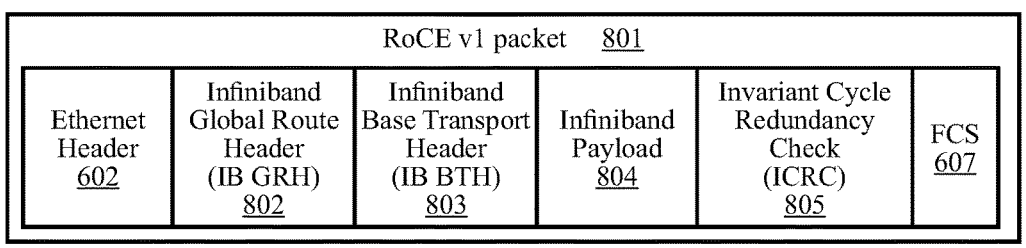
FIG. 8 illustrates a RoCE v1 (RDMA over converged ethernet, version 1) packet according to some aspects.

FIG. 8 illustrates a RoCE v1 (RDMA over converged ethernet, version 1) packet 801 according to some aspects. The format of RoCE v1 packets 801 is specified in "The InfiniB and Architecture Specification Volume 1, Release 1.4" published by the InfiniBand Trade Association on Apr. 7, 2020 ("the InfiniBand Specification"). The RoCE v1 packet 801 can be seen to be an ethernet packet having an Ethernet payload that includes an InfiniB and Global Route Header (IB GRH) 802, an InfiniBand Base Transport Header (IB BTH) 803, an InfiniBand payload 804, and an Invariant Cyclic Redundancy Check (ICRC) 805 field.

Figure 9:
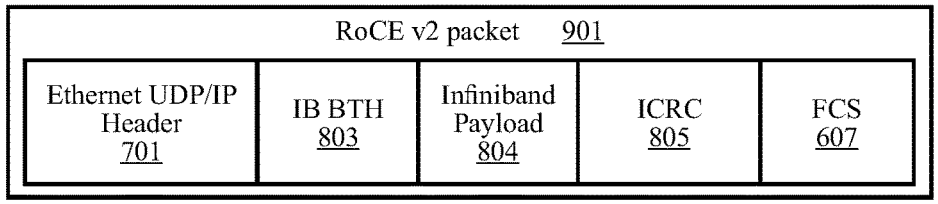
FIG. 9 illustrates a RoCE v2 (RDMA over converged ethernet, version 2) packet according to some aspects.

FIG. 9 illustrates a RoCE v2 (RDMA over converged ethernet, version 2) packet 901 according to some aspects. The format of RoCE v2 packets 901 is specified in the InfiniBand Specification. RoCE v2 packet 901 can be seen to be an Ethernet UDP/IP packet having a UDP payload that includes the IB BTH 803, the InfiniB and payload 804, and the ICRC 805. Here, Ethernet is the layer 2 transport for a UDP packet carrying the InfiniB and elements. Other layer 2 protocols may be used as the layer 2 transport.

Figure 10:
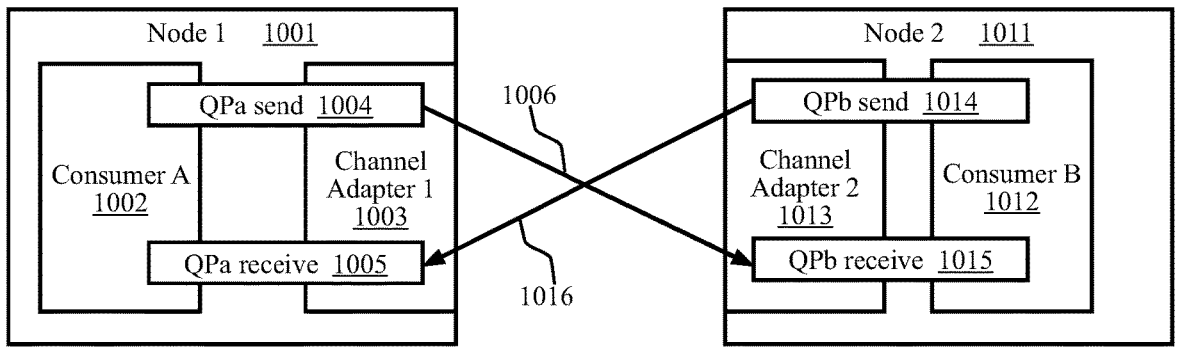
FIG. 10 illustrates two consumers exchanging data via InfiniBand according to some aspects.

FIG. 10 illustrates two consumers exchanging data via InfiniBand according to some aspects. Consumer A 1002 is a process running on node 1 1001. Node 1 1001 has an InfiniBand channel adapter 1 1003. Consumer B 1012 is a consumer running on node 2 1011. Node 2 1011 has an InfiniBand channel adapter 2 1013. Consumer A 1002 uses QPa (queue pair "a") to send data to and receive data from consumer B 1012. Consumer B 1012 uses QPb (queue pair "b") to send data to and receive data from consumer A 1002. QPa and QPb are therefore attached to one another. Consumer B 1012 can prepare to receive data by submitting WRs (work requests) to the QPb receive queue 1015. In response to receiving the WRs, channel adapter 2 1013 can place WQEs (work queue elements) on the PQb receive queue. Consumer A 1002 can send data to consumer B by submitting a WR to the QPa send queue 1004. Channel adapter 1 1003 processes the WR and sends the data to channel adapter 2 1013 as one or more packets 1006, such as RoCE v2 packets. Channel adapter 2 processes the packets and uses the WQEs in the QPb receive queue 1015 to receive the data. Consumer B 1012 can send data to consumer A 1002 along a similar route using packets 1016 sent from QPb send queue 1014 to the QPa receive queue 1005. The example of FIG. 10 does not use a SRQ (shared receive queue). As such, every receive queue must have its own WQEs for receiving data.

Figure 11:
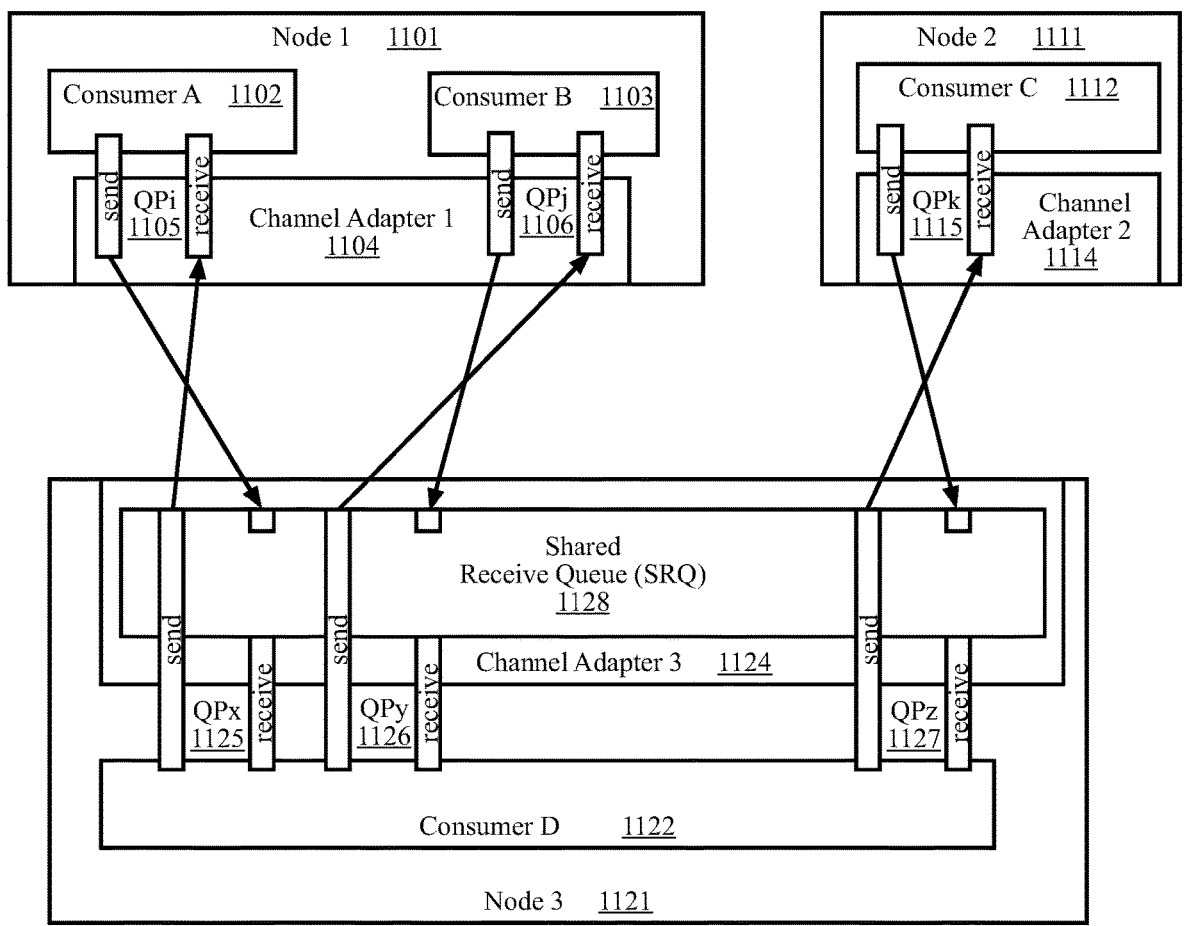
FIG. 11 illustrates consumers exchanging data via InfiniB and a channel adapter having a SRQ (shared receive queue) according to some aspects.

FIG. 11 illustrates consumers exchanging data via InfiniB and a channel adapter having a SRQ (shared receive queue) 1128 according to some aspects. Consumer A 1102 and consumer B 1103 are processes running on node 1 1101 that has InfiniBand channel adapter 1 1104. Consumer C 1112 is a process running on node 2 1111 which has InfiniB and channel adapter 2 1114. Consumer D 1122 is a process running on node 3 1121 that has InfiniB and channel adapter 3 1124. Consumer A 1102 exchanges data with consumer D 1122 via QPi 1105. Consumer D 1122 exchanges data with consumer A 1102 via QPx 1125. QPi 1105 is attached to QPx 1125. Consumer B 1103 exchanges data with consumer D 1122 via QPj 1106. Consumer D 1122 exchanges data with consumer B 1103 via QPy 1126. QPj 1106 is attached to QPy 1126. Consumer C 1112 exchanges data with consumer D 1122 via QPk 1115. Consumer D 1122 exchanges data with consumer C 1112 via QPz 1127. QPk 1115 is attached to QPz 1127.

QPx 1125, QPy 1126, and QPz 1127 all use SRQ 1128. As such, data sent from consumer A 1102, consumer B 1103, or consumer C 1112 to consumer D 1112 consumes the WQEs of the SRQ.

Regarding the example of FIG. 11, neither channel adapter 1 1104 nor channel adapter 2 1114 is shown implementing an SRQ. Channel adapters implementing SRQs are interoperable with channel adapters that are not implementing SRQs.

Figure 12:
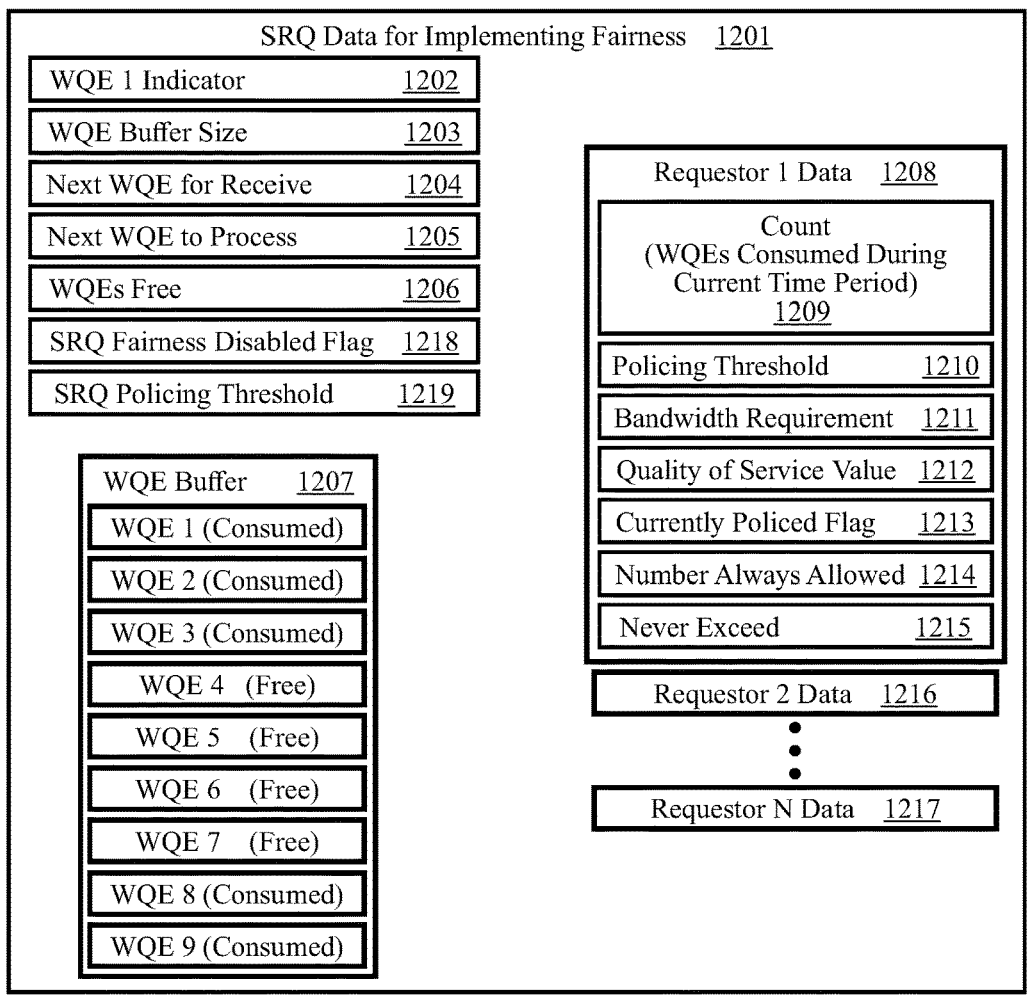
FIG. 12 illustrates SRQ data for implementing fairness according to some aspects.

FIG. 12 illustrates SRQ data for implementing fairness 1201 according to some aspects. The SRQ has a WQE buffer 1207. The WQEs in the WQE buffer 1207 are a shared resource for the consumers and requesters using the SRQ. In this non-limiting example, the WQE buffer 1207 is a circular buffer. The WQE 1 indicator 1202 can indicate the location in memory of WQE 1 in the WQE buffer 1207. WQE buffer size 1203 can indicate the size of the WQE buffer 1207. In this example, the WQE buffer 1207 is sized to hold nine WQEs. In practice, a storage server may have thousands or millions of WQEs in an SRQ. The next WQE for receive 1204 indicates the next location in the WQE buffer that will receive data from a requester. Here, that next location for receiving is WQE 4, which is the first of the WQEs marked "free". The next WQE to process 1205 indicates the next location in the WQE buffer that should be processed. Recalling that the WQE buffer 1207 is a circular buffer, the next location for processing is WQE 8, which is the first location marked "consumed". WQEs free 1206 indicates how many free WQEs are in the WQE buffer 1207. The SRQ fairness disabled flag 1218 indicates that fairness is currently disabled for the SRQ. When SRQ fairness is disabled, the WQE consumption of the requesters is not policed. The SRQ policing threshold 1219 can indicate a number of available WQEs above which policing is disabled. In essence, when the number of WQEs free is high enough, fairness is disabled because there are enough WQEs available for all the requesters.

The SRQ data for implementing fairness 1201 includes data for each requester such as requester 1 data 1208, requester 2 data 1216, and requester N data 1217. Requester data can contain a count 1209, a policing threshold 1210, a bandwidth requirement 1211, a quality of service value 1212, a currently policed flag 1213, a number always allowed 1214, and a never exceed value 1215. The count 1209 can be the number of WQEs consumed during the current time period. The policing threshold 1210 can be the number of WQEs that the requester can consume before policing is enabled for the requester such that the requester's WQE consumption is reduced. The requester's policing threshold 1210 can be based, at least in part, on the bandwidth requirement 1211. For example, the policing threshold can be set such that the requesters required bandwidth never triggers policing the requester. The requester's policing threshold 1210 can be based, at least in part, on the requester's quality of service value 1212. As such, a requester having a higher quality of service value 1212 than another requester can have a higher policing threshold 1210 than that other requester. For example, the policing threshold can be incremented or multiplied by a value dependent on the quality of service value 1212. The currently policed flag 1213 can indicate that policing is enabled for the requester such that the requester's WQE consumption is reduced. The number always allowed 1214 can be a number of WQEs the requester is always allowed to consume over a predetermined time period. For example, if the predetermined time period is one minute, the requester may be always allowed to consume ten WQEs each minute. The never exceed value 1215 can be a number of WQEs the requester is never allowed to consume over a predetermined time period. For example, all requests from the requester can be denied (e.g. receiver not ready response returned) if count 1209 equals never exceed 1215.

Figure 13:
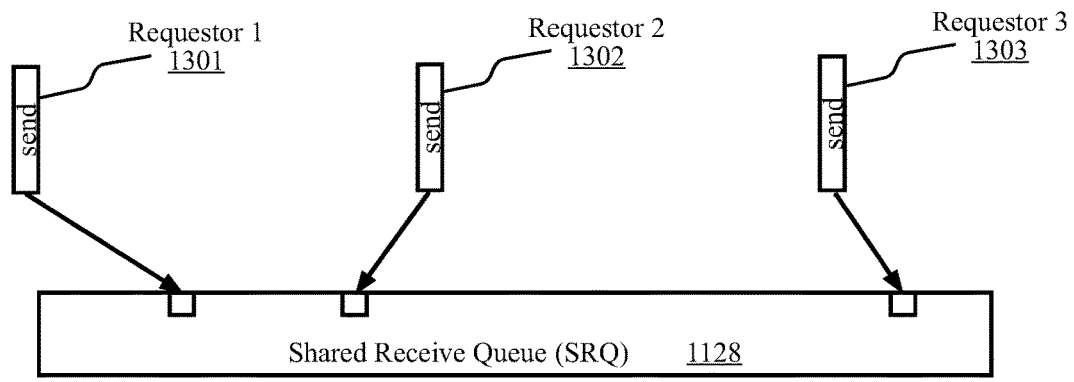
FIG. 13 illustrates requesters interacting with an SRQ according to some aspects.

FIG. 13 illustrates requesters 1301, 1302, 1303 interacting with an SRQ 1304 according to some aspects. FIG. 13 shows the consumer A, B, and C send queues of FIG. 11 as requesters attached to the SRQ 1128 which is the responder. In InfiniB and transactions, a requester is a queue pair that initiates an operation. A responder is a queue pair that responds to a request. For example, the requester can be the queue pair that sends a message and the responder is the queue pair that receives the message.

Figure 14:
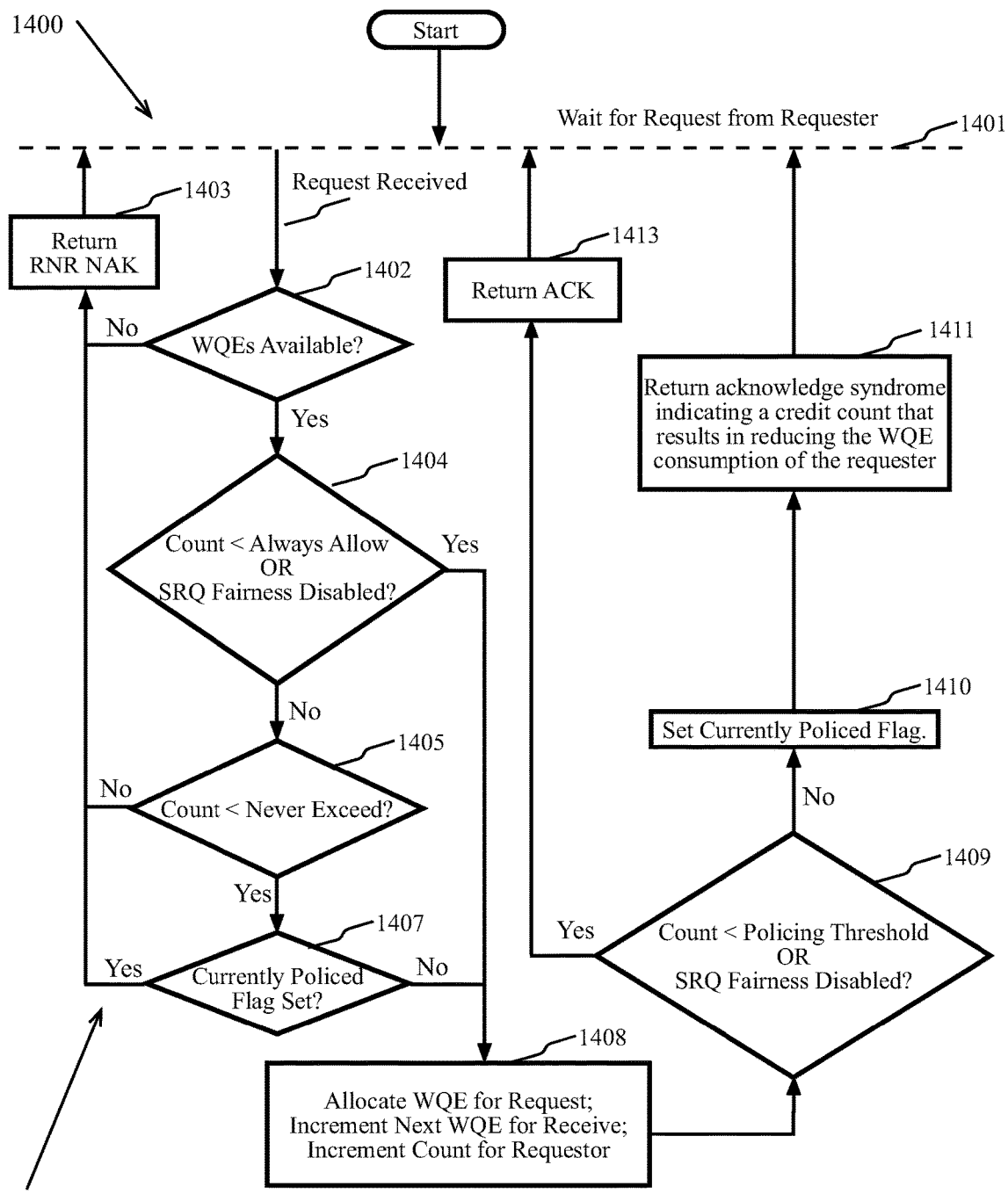
FIG. 14 is a high-level flow diagram illustrating a non-limiting example of implementing fairness among requesters connected to a SRQ according to some aspects.

FIG. 14 is a high-level flow diagram illustrating a non-limiting example of implementing fairness 1400 among requesters connected to a SRQ according to some aspects. The non-limiting example of FIG. 14 makes use of values in SRQ data for implementing fairness 1201. The process of FIG. 14 may be implemented for each requester. At 1401, the process waits for a request from a requester. After receiving a request, at block 1402 the process checks to see if the SRQ has WQEs available (e.g. WQEs free>0). If no WQE is available, a RNR NAK (receiver not ready negative acknowledgement) is returned to the requester at block 1403 and the process goes back to waiting for a request 1401. In response to receiving a RNR NAK, InfiniB and requesters are supposed to wait for a time before sending another request. As such, sending an RNR NAK to the requester causes the requester to reduce its consumption of the SRQ's WQEs.

At block 1404, the process determines if count is less than always allowed or if SRQ fairness is disabled. If so, the process moves to block 1408 and a WQE is consumed by being allocated for the request, "next WQE for receive" is incremented, the requester's count is incremented. Otherwise the process moves from block 1404 to block 1405 where the process determines if count is less than never exceed. If not, the process moves to block 1403, discussed above. Otherwise, the process checks if the requester is currently policed at block 1407. If the requester is policed, the process moves to block 1403, discussed above. Otherwise, the process moves to block 1408, also discussed above. From block 1408, the process moves to block 1409 where the process determines if count is less than the policing threshold or if SRQ fairness is disabled. If so, an acknowledgement is sent to the requester 1413 and the process goes back to waiting for a request 1401. Otherwise, the currently policed flag is set at block 1410. At block 1411, the process can return an acknowledge syndrome indicating a credit count that results in reducing the WQE consumption of the requester. Acknowledge syndromes are bit fields carried in the AETH (Ack Extended Transport Header) of acknowledge messages as defined in the InfiniB and Specification. After block 1411, the process goes back to waiting for a request 1401.

Figure 15:
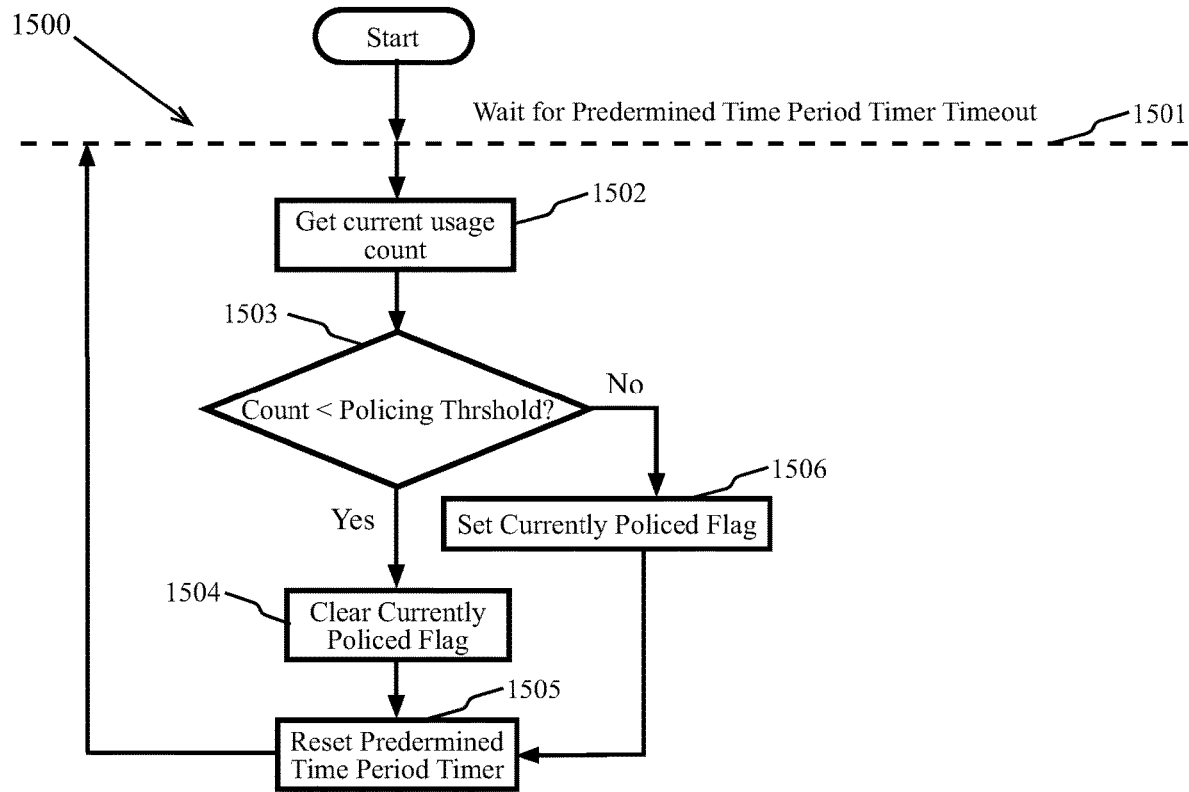
FIG. 15 is a high-level flow diagram illustrating a non-limiting example of managing a currently policed flag for a SRQ implementing fairness among requestors according to some aspects.

FIG. 15 is a high-level flow diagram illustrating a non-limiting example of managing a currently policed flag 1500 for a SRQ implementing fairness among requesters according to some aspects. The non-limiting example of FIG. 15 makes use of values in SRQ data for implementing fairness 1201. The process of FIG. 15 may be implemented for each requester. The process can wait for a predetermined time period timer to timeout 1501. As discussed above, the predetermined time period can be a minute. The predetermined time period can be far less than a minute, or even a second in the case of a very high-performance compute cluster. In general, the predetermined time period is determined based on the computing environment and may be tuned to increase system throughput.

After the predetermined time period timer times out, the process gets the current count 1502. The count is maintained by the channel adapter based on the number of outstanding message requests for the queue pair. At block 1503, the count is compared to the policing threshold. If count is less than the policing threshold, the currently policed flag is cleared at block 1504. At block 1505, the predetermined time period timer is reset such that it times out after another predetermined time period elapses before the process goes back to waiting for the predetermined time period timer to timeout 1501. If count is not less than the policing threshold at block 1503 then the currently policed flag is set at block 1506 and the timer is reset at block 1505 before the process goes back to waiting for the predetermined time period timer to timeout 1501.

Policing the requester can be initiated immediately upon setting the currently policed flag, can be initiated in the immediately subsequent time period, and can extend to the end of the immediately subsequent time period. For example, consider two predetermined time periods. The first predetermined time period goes from t0 to t1. The second predetermined time period goes from t1 to t2. The second predetermined time period is immediately subsequent to the first time period because it is the time period occurring right after the first time period. Determining, during the first time period, that the requester is to be policed can result in immediately initiating policing the requester and/or policing the requester during the second predetermined time period.

Figure 16:
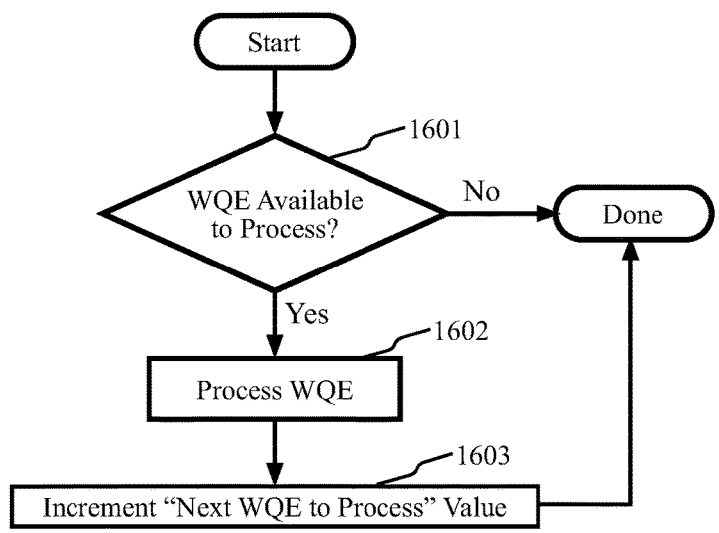
FIG. 16 is a high-level flow diagram illustrating a non-limiting example of processing the WQEs of a SRQ implementing fairness among requesters according to some aspects.

FIG. 16 is a high-level flow diagram illustrating a non-limiting example of processing the WQEs of a SRQ implementing fairness among requesters according to some aspects. At block 1601, the process determines if the SRQ has WQEs available to process. For example, the WQEs marked "consumed" in WQE buffer 1207 are available to process, beginning with WQE 8 as indicated by "next WQE to process" 1205. If there are no WQEs to process, the process is done. If there are WQEs to process, at block 1602 the "next WQE to process" is processed. At block 1603, the "next WQE to process" value is incremented (or set to the WQE 1 if needed for this circular buffer) and the process loops back to block 1601.

Figure 17:
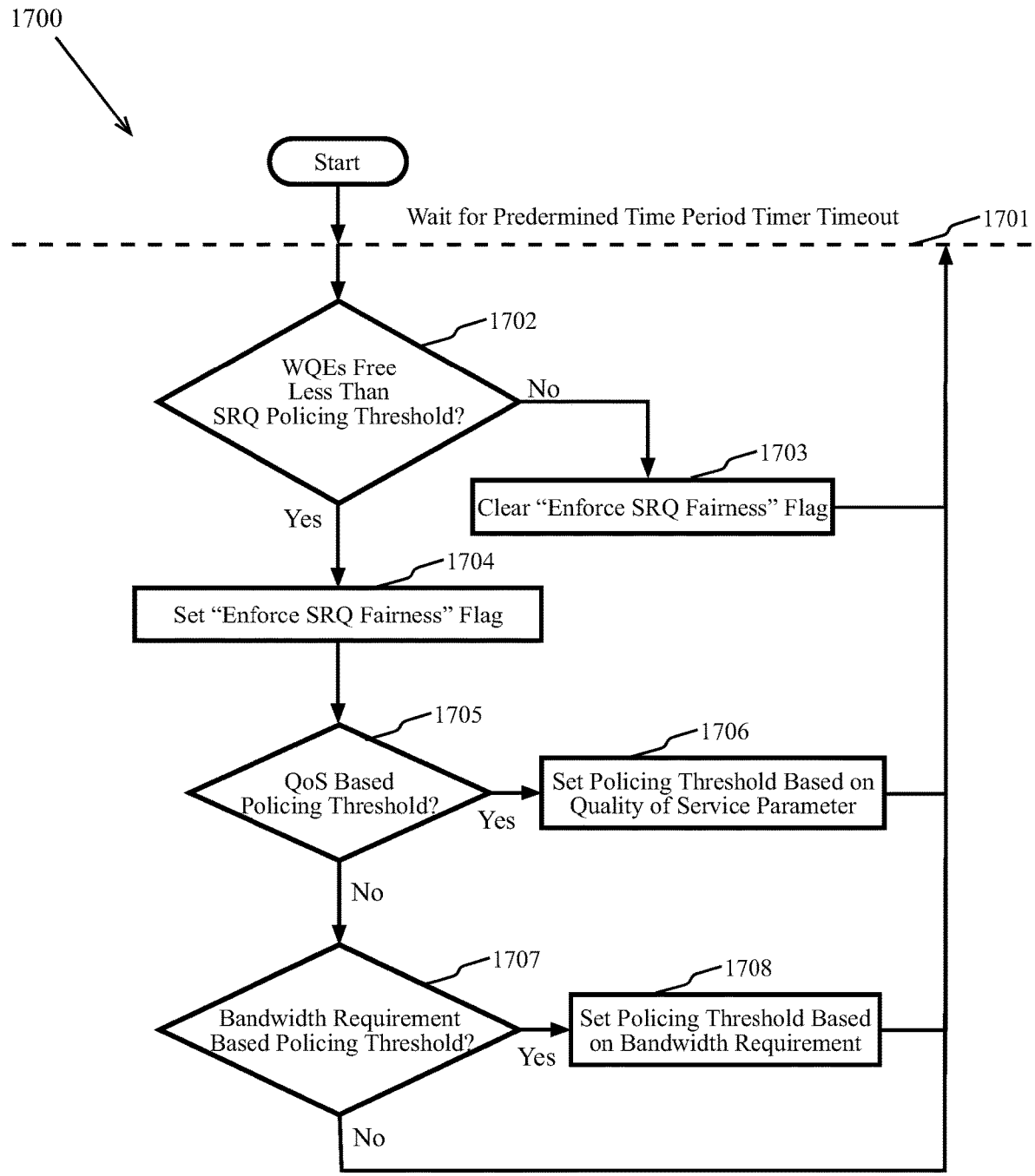
FIG. 17 is a high-level flow diagram illustrating a non-limiting example of setting policing thresholds for requesters connected to a SRQ implementing fairness among requesters according to some aspects.

FIG. 17 is a high-level flow diagram illustrating a non-limiting example of setting policing thresholds 1700 for requesters connected to a SRQ implementing fairness among requesters according to some aspects. The non-limiting example of FIG. 17 makes use of values in SRQ data for implementing fairness 1201. The process of FIG. 17 may be implemented for each requester. The process can wait for a predetermined time period timer to timeout 1701. After the predetermined time period timer times out, at block 1702 the process determines if the SRQ's total number of free WQEs is less than a SRQ policing threshold. If not, at block 1703 the "Enforce SRQ Fairness" flag is cleared and the process goes back to waiting for the predetermined time period timer to timeout 1701. If the SRQ's total number WQEs free is less than a SRQ policing threshold, then at block 1704 the "Enforce SRQ Fairness" flag is set. The "Enforce SRQ Fairness" flag can indicate whether SRQ fairness is enabled or disabled. At block 1705, the process determines if a requester's policing threshold is based on the requester's quality of service parameter. If so, the policing threshold is set based on the requester's quality of service parameter 1706 before the process goes back to waiting for the predetermined time period timer times out 1701. At block 1707, the process determines if the requester's policing threshold is based on the requester's bandwidth requirement. If so, the policing threshold is set based on the requester's bandwidth requirement 1708 before the process goes back to waiting for the predetermined time period timer times out 1701. Otherwise, the process goes back to waiting for the predetermined time period timer times out 1701.

Those practiced in the art of computer programming understand that FIGS. 14-17 illustrate non-limiting examples by which embodiments may be implemented. Alternative embodiments may include comparing counts to thresholds/limits and clearing/setting flags every time a request is received or upon the occurrence of some other event.

Figure 18:
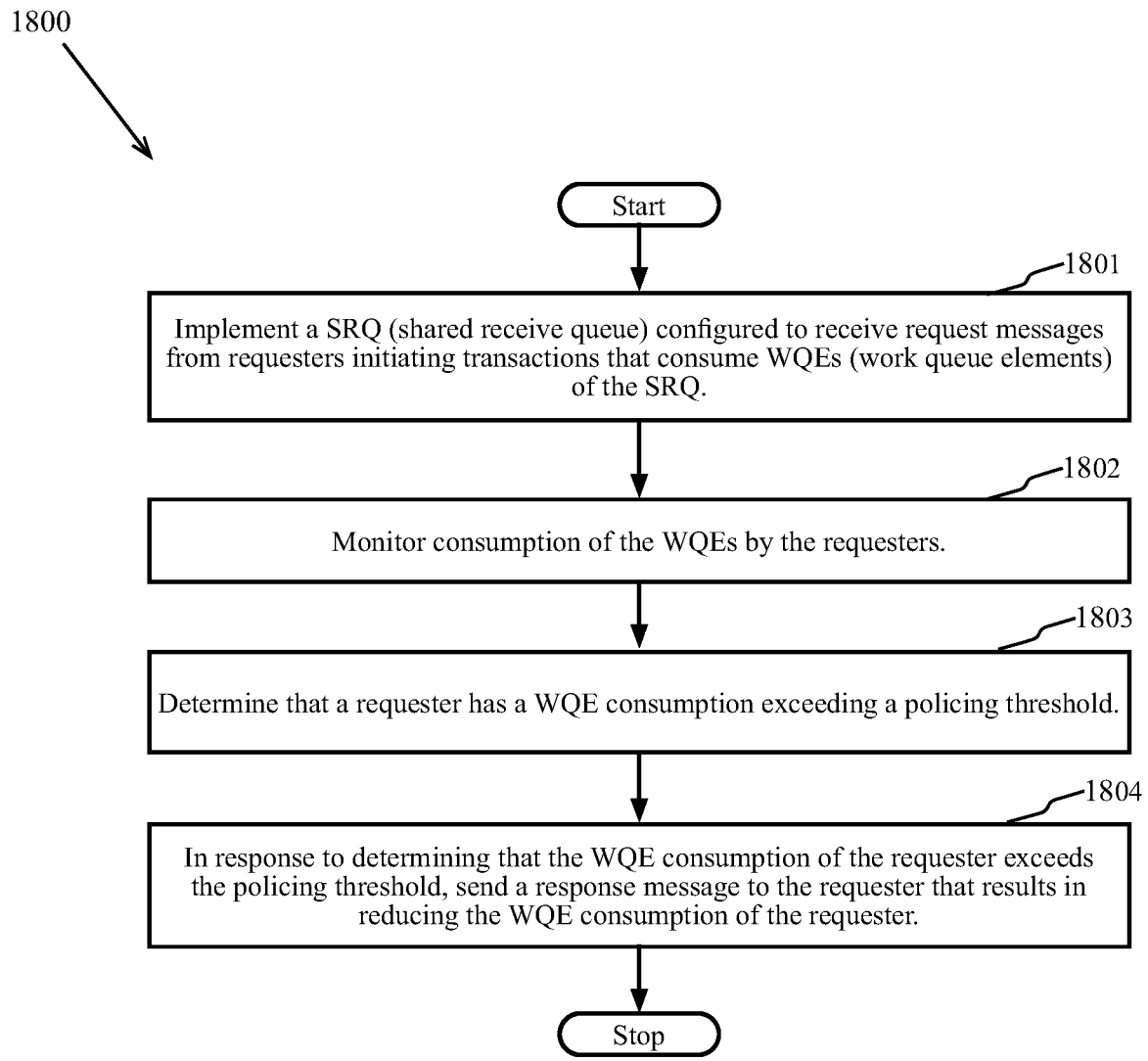
FIG. 18 is a high-level block diagram of a method for fairness across RDMA requesters using a shared receive queue according to some aspects.

FIG. 18 is a high-level block diagram of a method for fairness across RDMA requesters using a shared receive queue 1800 according to some aspects. At block 1801, the method can implement a SRQ (shared receive queue) configured to receive request messages from requesters initiating transactions that consume WQEs (work queue elements) of the SRQ. At block 1802, the method can monitor consumption of the WQEs by the requesters. At block 1803, the method can determine that a requester has a WQE consumption exceeding a policing threshold. At block 1804, the method can, in response to determining that the WQE consumption of the requester exceeds the policing threshold, send a response message to the requester that results in reducing the WQE consumption of the requester.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
implementing an InfiniBand shared receive queue (SRQ);
receiving a plurality of InfiniB and request messages from a plurality of requesters initiating transactions that consume work queue elements (WQEs) of the InfiniB and SRQ;
monitoring, for each of the requesters, consumption of the WQEs by the requesters;
receiving an InfiniB and request message from one of the requesters;
determining that the one of the requesters has a WQE consumption exceeding a policing threshold; and
in response to determining that the WQE consumption of the one of the requesters exceeds the policing threshold, sending an InfiniB and response message to the one of the requesters that results in reducing the WQE consumption of the one of the requesters.

2. The method of claim 1, wherein:
an InfiniB and channel adapter implements the method;
the InfiniB and channel adapter includes a packet processing pipeline circuit that includes a plurality of match-action units configured as a match-action pipeline of a packet processing pipeline;
the match-action pipeline processes the InfiniBand request messages;
the packet processing pipeline circuit monitors consumption of the WQEs; and
the packet processing pipeline circuit sends the InfiniBand response message.

3. The method of claim 1 wherein the InfiniBand response message is an InfiniBand receiver not ready negative acknowledgment (RNR NAK).

4. The method of claim 1, wherein the InfiniB and response message includes an acknowledge syndrome indicating a credit count that results in reducing the WQE consumption of the one of the requesters.

5. The method of claim 1 wherein monitoring WQE consumption of the requesters is performed over a predetermined time period, and reducing the WQE consumption of the one of the requesters is performed for a subsequent predetermined time period.

6. The method of claim 5 further including:
initializing a counter associated with the one of the requesters at a beginning of the predetermined time period; and
incrementing the counter when the one of the requesters consumes a WQE.

7. The method of claim 1 wherein the policing threshold is related to a quality of service value associated with the one of the requesters.

8. The method of claim 1 wherein the policing threshold is related to a bandwidth requirement associated with the one of the requesters.

9. The method of claim 1 further including:
reducing the WQE consumption of the one of the requesters only when a SRQ WQE available value is below a threshold.

10. The method of claim 1 wherein the policing threshold is dynamically adjusted based on a SRQ WQE available value.

11. An InfiniB and channel adapter-comprising:
a memory; and
at least one central processing unit (CPU) core operatively coupled to the memory,
wherein
the InfiniB and channel adapter implements an InfiniB and SRQ in the memory,
InfiniBand flow control is not enabled because the InfiniBand SRQ is enabled,
the InfiniB and channel adapter receives a plurality of InfiniB and request messages from a plurality of requesters initiating transactions that consume WQEs of the InfiniBand SRQ,
the InfiniB and channel adapter monitors, for each of the requesters, consumption of the WQEs by the requesters,
the InfiniB and channel adapter receives an InfiniB and request message from one of the requesters,
the InfiniB and channel adapter determines that the one of the requesters has a WQE consumption exceeding a policing threshold, and
in response to determining that the WQE consumption of the one of the requesters exceeds the policing threshold, the InfiniB and channel adapter sends an InfiniB and response message to the one of the requesters that results in reducing the WQE consumption of the one of the requesters.

12. The InfiniB and channel adapter of claim 11, further including
a packet processing pipeline circuit that includes a plurality of match-action units configured as a match-action pipeline of a packet processing pipeline,
wherein
the at least one CPU core configures the packet processing pipeline to process the InfiniBand request messages,
the packet processing pipeline monitors consumption of the WQEs, and
the packet processing pipeline sends the InfiniB and response message.

13. The InfiniB and channel adapter of claim 11, wherein the InfiniB and response message is a RNR NAK.

14. The InfiniB and channel adapter of claim 11, wherein the InfiniBand response message includes an acknowledge syndrome indicating a credit count that results in reducing the WQE consumption of the one of the requesters.

15. The InfiniB and channel adapter of claim 11, wherein:
the InfiniB and channel adapter initializes a counter associated with the one of the requesters at a beginning of a predetermined time period;
the InfiniB and channel adapter increments the counter when the one of the requesters consumes one of the WQEs;
the InfiniB and channel adapter determines the WQE consumption of the one of the requesters at an end of the predetermined time period; and
a reduction based on the WQE consumption during the predetermined time period is applied only during an immediately subsequent predetermined time period.

16. The InfiniB and channel adapter of claim 11, wherein the policing threshold is related to a quality of service value associated with the one of the requesters.

17. The InfiniB and channel adapter of claim 11, wherein the policing threshold is related to a bandwidth requirement associated with the one of the requesters.

18. The InfiniB and channel adapter of claim 11 wherein the InfiniB and channel adapter reduces the WQE consumption of the one of the requesters only when a SRQ WQE available value is below a threshold.

19. The InfiniB and channel adapter of claim 11, wherein the policing threshold is dynamically adjusted based on a SRQ WQE available value.

20. A system comprising:
an InfiniB and shared resource queue (SRQ) SRQ means for buffering a plurality of InfiniB and WQEs;
a means for receiving a plurality of InfiniB and request messages from a plurality of requesters initiating transactions that consume the InfiniB and WQEs of the InfiniB and SRQ;
a means for enforcing fairness among the requesters in utilizing the means for receiving the InfiniB and request messages;
a monitoring means for monitoring, for each of the requesters, consumption of the InfiniB and WQEs by the requesters;
a determination means for determining that one of the requesters has a WQE consumption exceeding a policing threshold; and
a response means for sending an InfiniB and response message to the one of the requesters that results in reducing the WQE consumption of the one of the requesters; and
wherein InfiniB and flow control is not enabled because the InfiniB and SRQ means is enabled.

* * * * *